(12) United States Patent
Wang et al.

(10) Patent No.: US 9,630,807 B1
(45) Date of Patent: Apr. 25, 2017

(54) ENERGY SAVING ELEVATOR APPARATUS WITH MAINTAINING POTENTIAL ENERGY BY INTELLECTUAL CONTROL VARIABLE MASS

(71) Applicants: Zhenkun Wang, Ashburn, VA (US);
Xiyou Wang, Ashburn, VA (US);
Shiyuan Song, Ashburn, VA (US)

(72) Inventors: Zhenkun Wang, Ashburn, VA (US);
Xiyou Wang, Ashburn, VA (US);
Shiyuan Song, Ashburn, VA (US)

( * ) Notice: Subject to any disclaimer, the term of this patent is extended or adjusted under 35 U.S.C. 154(b) by 0 days.

(21) Appl. No.: 15/055,332

(22) Filed: Feb. 26, 2016

(30) Foreign Application Priority Data

Feb. 20, 2016 (CN) ...................... 2016 2 0129304 U

(51) Int. Cl.
*B66B 17/12* (2006.01)
*B66B 1/34* (2006.01)

(52) U.S. Cl.
CPC ............ *B66B 17/12* (2013.01); *B66B 1/3476* (2013.01)

(58) Field of Classification Search
CPC ............................... B66B 17/12; B66B 1/3476
See application file for complete search history.

(56) References Cited

U.S. PATENT DOCUMENTS

| | | | | |
|---|---|---|---|---|
| 4,236,605 A | * | 12/1980 | Lindbergh | B66B 17/12 187/405 |
| 5,260,527 A | * | 11/1993 | Sirag, Jr. | B66B 1/2408 187/380 |
| 8,245,819 B2 | * | 8/2012 | Hikita | B66B 5/021 187/314 |
| 8,316,996 B2 | * | 11/2012 | Hashimoto | B66B 1/32 187/281 |
| 8,413,767 B2 | * | 4/2013 | Nakashima | B66B 1/468 187/384 |
| 8,439,168 B2 | * | 5/2013 | Kondo | B66B 1/32 187/288 |
| 8,678,142 B2 | * | 3/2014 | Takeuchi | B66B 1/468 187/247 |
| 9,067,762 B2 | * | 6/2015 | Fargo | B66B 1/302 |
| 9,114,955 B2 | * | 8/2015 | Sakai | B66B 1/285 |
| 9,365,393 B2 | * | 6/2016 | Salmikuukka | B66B 1/3461 |
| 9,533,858 B2 | * | 1/2017 | Hanninen | B66B 1/34 |
| 2008/0230322 A1 | * | 9/2008 | Chung | B66B 17/12 187/250 |

(Continued)

*Primary Examiner* — David Warren
(74) *Attorney, Agent, or Firm* — WPAT, PC; Justin King

(57) ABSTRACT

The present invention provides a variable mass elevator apparatus and method of operation, wherein the apparatus comprises an electronic scale, an elevator car, a traction sheave, a control computer, a mass storage area, a mass, a mass conveyor, a floor control panel outside of the elevator. When a passenger desires to operate the elevator, the passenger steps on the electronic scale and chooses a floor on the floor control panel, wherein the floor control panel has buttons for each floor. The electronic scale relays the weight of the passenger to the control computer, and the floor control panel relays the desired floor to the control computer. The control computer instructs a mass conveyer to couple a mass corresponding to the weight of the passenger to the elevator cable to act as a counterweight and equalize the potential energy of the elevator according to the desired floor of the passenger and the weight of the passenger.

6 Claims, 7 Drawing Sheets

(56) References Cited

U.S. PATENT DOCUMENTS

| | | | |
|---|---|---|---|
| 2011/0171895 A1* | 7/2011 | Tanishima | B66B 11/0226 454/68 |
| 2013/0233653 A1* | 9/2013 | Chen | B66B 1/3476 187/381 |
| 2015/0021123 A1* | 1/2015 | Lee | B66B 1/3476 187/387 |
| 2015/0114765 A1* | 4/2015 | Kattainen | B66B 5/0087 187/405 |

* cited by examiner

ENERGY SAVING ELEVATOR APPARATUS WITH MAINTAINING POTENTIAL ENERGY BY INTELLECTUAL CONTROL VARIABLE MASS

BACKGROUND OF THE INVENTION

Modern elevator apparatus used in buildings primarily comprise rails, counterweights, safety devices, a signal control system, elevator car, elevator doors and other components. Elevators are installed in shafts, usually adjacent to or connected to the machine room of a building.

Many modern elevators are operated by a traction drive, wherein at least one cable has one end connected to the elevator car, is held in position by a traction sheave, and has the other end of the cables connected to the counterweight. Usually, the elevator is then operated by a motor coupled to the traction sheave, which raises or lowers the elevator.

Elevators design requires high transmission efficiency between the motor, the traction shave, and the cable. The basic design goals for modern elevators require the elevator to be energy efficient, safe, and accurately find each level. Elevators are designed around a rated load, a maximum speed, outer dimensions, and the size of the elevator shaft.

Passenger elevators also need to be intelligently controlled, often by computers such that people can use the elevators without the assistance of a specialized operator. Conventional elevator design also requires users to choose their floors once they have stepped inside the elevator, which can be inefficient. Furthermore, the energy efficiency of elevators can be further increased.

BRIEF SUMMARY OF THE INVENTION

It is an object of the invention to provide a variable mass elevator apparatus with an external control and a method of operation thereof.

According to an embodiment of the present invention, a variable mass elevator apparatus with an external control is provided, wherein the variable mass elevator apparatus with an external control comprises an electronic scale, an elevator car, a traction sheave, a control computer, a mass storage area, a mass, a mass conveyer, a floor control panel, and an elevator door.

The present invention provides an elevator car disposed in an elevator shaft coupled to a control computer. The elevator car is coupled to a cable and the cable goes around a traction sheave disposed at the top of the elevator shaft. An electronic scale is disposed outside of the elevator shaft, such that an elevator passenger has to step on the electronic scale prior to stepping into the elevator. Disposed outside of the elevator shaft is a floor control panel. The electronic scale is coupled to the control computer. On the opposite side of the elevator shaft from the elevator door, a mass storage area is disposed on each floor of the building with an attached mass conveyer. Within the mass storage areas are masses. The control computer is connected to the mass conveyer.

When a passenger desires to operate the elevator, the passenger steps on the electronic scale and chooses a floor on the floor control panel, wherein the floor control panel has buttons for each floor. The electronic scale relays the weight of the passenger to the control computer, and the floor control panel relays the desired floor to the control computer.

The control computer upon receiving the desired floor and the weight of the passenger will send a signal to the traction sheave and motor coupled to said traction sheave to move the elevator car to the floor that the passenger is on and stop the elevator at that floor. The elevator door will open once at the floor the passenger is on. Once the elevator car has arrived at the passenger's floor, the control computer will signal to the mass conveyer to move a mass from the mass storage area corresponding to the mass of the passenger to couple with the elevator cable and act as a counterweight to the elevator car and passenger.

The passenger, once inside the elevator car, will have his or her potential energy matched by the counterweight mass that the mass conveyer has coupled to the elevator cable. For instance, if the passenger weighs 50 kg, the mass conveyer will move five 10 kg mass units to be coupled to the elevator cable. By adjusting the mass of the counterweight to match the weight of the passenger, the potential energy of the weight of the passenger suspended by the elevator will be effectively countered by the potential energy of the mass coupled to the elevator cable as a counterweight. By variably adjusting the mass of the counterweight to match the weight of the passenger, the elevator car can then be moved by the traction sheave coupled to the motor with less energy.

The elevator car will then be moved to the desired floor where the elevator door will open to allow the passenger to exit. Once the elevator car has arrived at the desired floor, the control computer will relay to the conveyer at the desired floor to remove the mass from the elevator cable into the mass storage area of the desired floor.

The above embodiment of the present invention allows for users to pre-select a desired floor, thus saving the user time from having to call an elevator and subsequently select a floor from inside the elevator car, and the adjusted variable mass counterweight will significantly reduce the required energy to move the elevator.

It is to be understood that both the forgoing general description and the following detailed description are exemplary and explanatory and are not restrictive of the invention, as claimed.

BRIEF DESCRIPTION OF THE DRAWINGS

The above embodiments become more readily apparent to those ordinarily skilled in the art after reviewing the following detailed description and accompanying drawings, in which.

DETAILED DESCRIPTION

Aspects, features and advantages of several exemplary embodiments of the present invention will become better understood with regard to the following description in connection with the accompanying drawings. It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute terms, such as, for example, "will," "will not," "shall," "shall not" "must," and "must not," are not meant to limit the scope of the present invention as the embodiments disclosed herein are merely exemplary.

Figure 1:
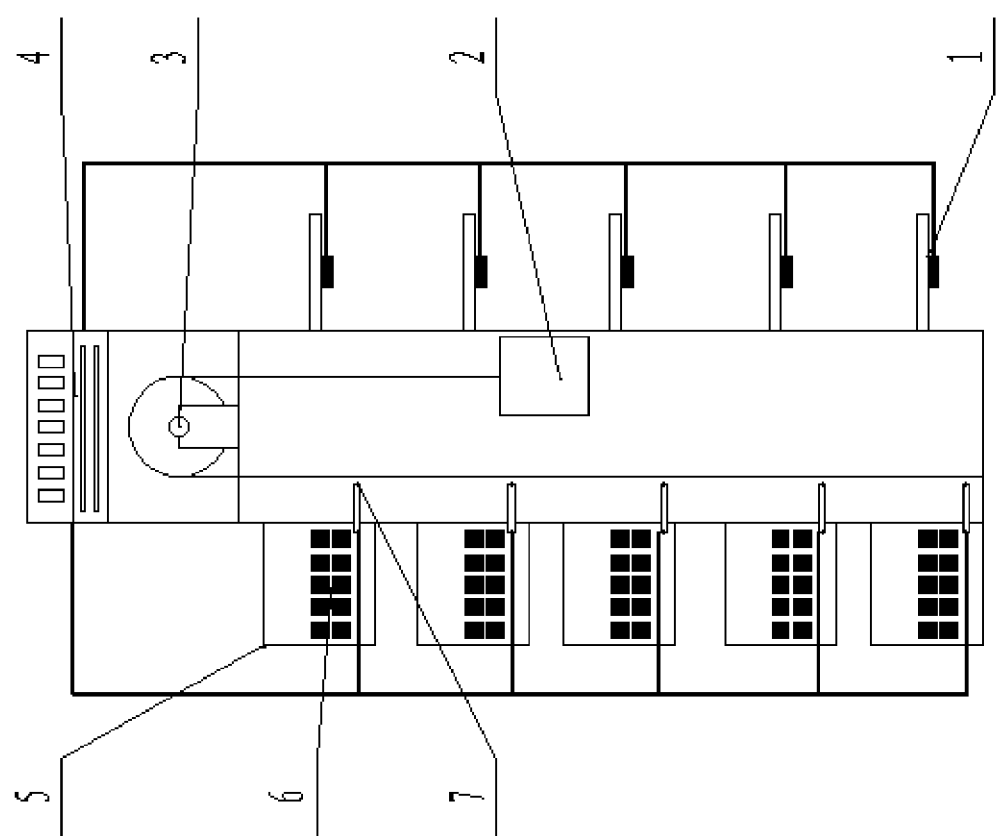
FIG. 1 is a schematic diagram of the variable mass elevator apparatus and external control.

FIG. 1 is an exemplary embodiment of the variable mass elevator apparatus and external control, comprising electronic scale 1, an elevator car 2, a traction sheave coupled to a motor 3, a control computer 4, a mass storage area 5, a mass 6, and a mass conveyor 7. The elevator car 2 is disposed in an elevator shaft and coupled to an elevator cable disposed about the traction sheave 3. The traction sheave 3 is coupled to the control computer 4. The control computer is also coupled to the electronic scale 1 disposed in front of the entrance to the elevator on each floor.

In this embodiment, the traction sheave 3 is coupled to an electric motor. Those of ordinary skill in the art will recognize that other means of powering the traction sheave can be used, like hydraulic or pneumatic power.

On the opposite side of the elevator shaft from the elevator car door side, a mass storage area 5 is disposed next to the elevator shaft on each floor and coupled to the mass conveyer 7. The mass conveyer 7 of each floor is coupled to the control computer to receive a signal to move a mass 6 to be coupled to the elevator cable according to the weight of the passenger relayed via the control computer 4. The electronic scale 1 is configured to relay the weight of the passenger to the control computer 4 via a signal line.

The control computer 4 controls the traction sheave 3 via signal line and controls the motor of the traction sheave 3 to move the elevator car 2 according to the user selection. The control computer 4 receives the weight of the user when the user is standing on the electronic scale 1 disposed in front of the entrance to the elevator. When the user selects a desired floor, the control computer 4 moves the elevator car 2 using the traction sheave 3 to the user's starting floor. Once the elevator car 2 has arrived at the user's starting floor, the control computer 4 controls the mass conveyer 7 to move a mass 6 from the mass storage area 5 corresponding to the weight of the passenger to be coupled to the elevator cable to act as a counterweight to the weight of the passenger.

Once the user has stepped inside the elevator car, the control computer 4 will instruct the traction sheave 3 to move the elevator car 2 to the desired floor. Once at the desired floor, the elevator car 2 will open its doors and allow the user to exit. The control computer 4 will signal to the mass conveyer 7 of the desired floor to move the mass 6 from the elevator cable and into the mass storage area 5 of the desired floor.

By moving the mass 6 to be used as a counterweight to the weight of the passenger, the present invention reduces the amount of energy required by the traction sheave 3 to move the elevator car 2. The control computer 4 instructs the mass conveyer 7 to move a mass 6 corresponding to the weight of the passenger to substantially counteract the potential energy of the passenger once inside the suspended elevator car 2. If the passenger weighs 50 kg, the mass 6 can be five 10 kg mass units. The mass 6 can comprise a number of fixed mass units. In FIG. 1, each mass unit is 10 kg.

Figure 2:
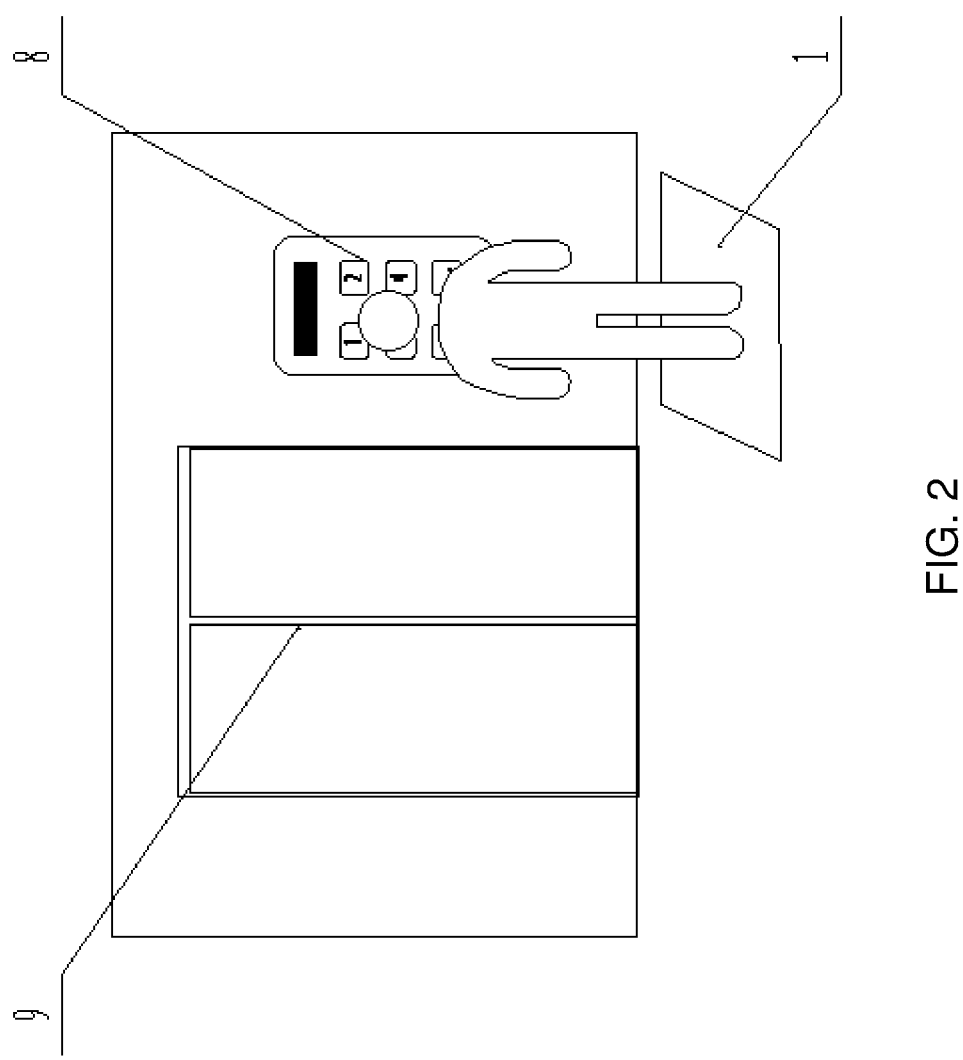
FIG. 2 is a schematic diagram from an entrance-side of the variable mass elevator apparatus and external control.

FIG. 2 is an exemplary embodiment of the entrance side of the variable mass elevator apparatus and external control, comprising an electronic scale 1, a floor control panel 8, and the elevator door 9. In this embodiment, the electronic scale 1 is disposed outside of the elevator door 9, and directly in front of the floor control panel 8, such that the user must step on the electronic scale 1 in order to input a desired floor into the floor control panel 8. In the present embodiment, the floor control panel 8 has a button for each floor that the elevator car can go to. The electronic scale 1 and floor control panel 8 are both coupled to the control computer via a signal line. When the user selects a floor on the floor control panel 8, the floor control panel 8 relays the desired floor information to the control computer. As the user is inputting the desired floor, the electronic scale 1 is weighing the user and relaying the weight of the user to the control computer. The control computer associates the weight of the passenger to the desired floor, such that each inputted desired floor instruction is associated with the weight of the passenger.

When two passengers wish to use the elevator, the first passenger steps on the electronic scale 1, and chooses a first desired floor on the floor control panel 8. The electronic scale 1 sends the weight of the first passenger to the control computer and the floor control panel 8 sends the first passenger's desired floor to the control computer. The control computer associates the first passenger's desired floor to the first passenger's weight.

The second passenger then steps on the electronic scale 1, and chooses a second desired floor on the floor control panel 8. The electronic scale 1 sends the weight of the second passenger to the control computer and the floor control panel 8 sends the second passenger's desired floor to the control computer. The control computer associates the second passenger's desired floor to the second passenger's weight.

Figure 3:
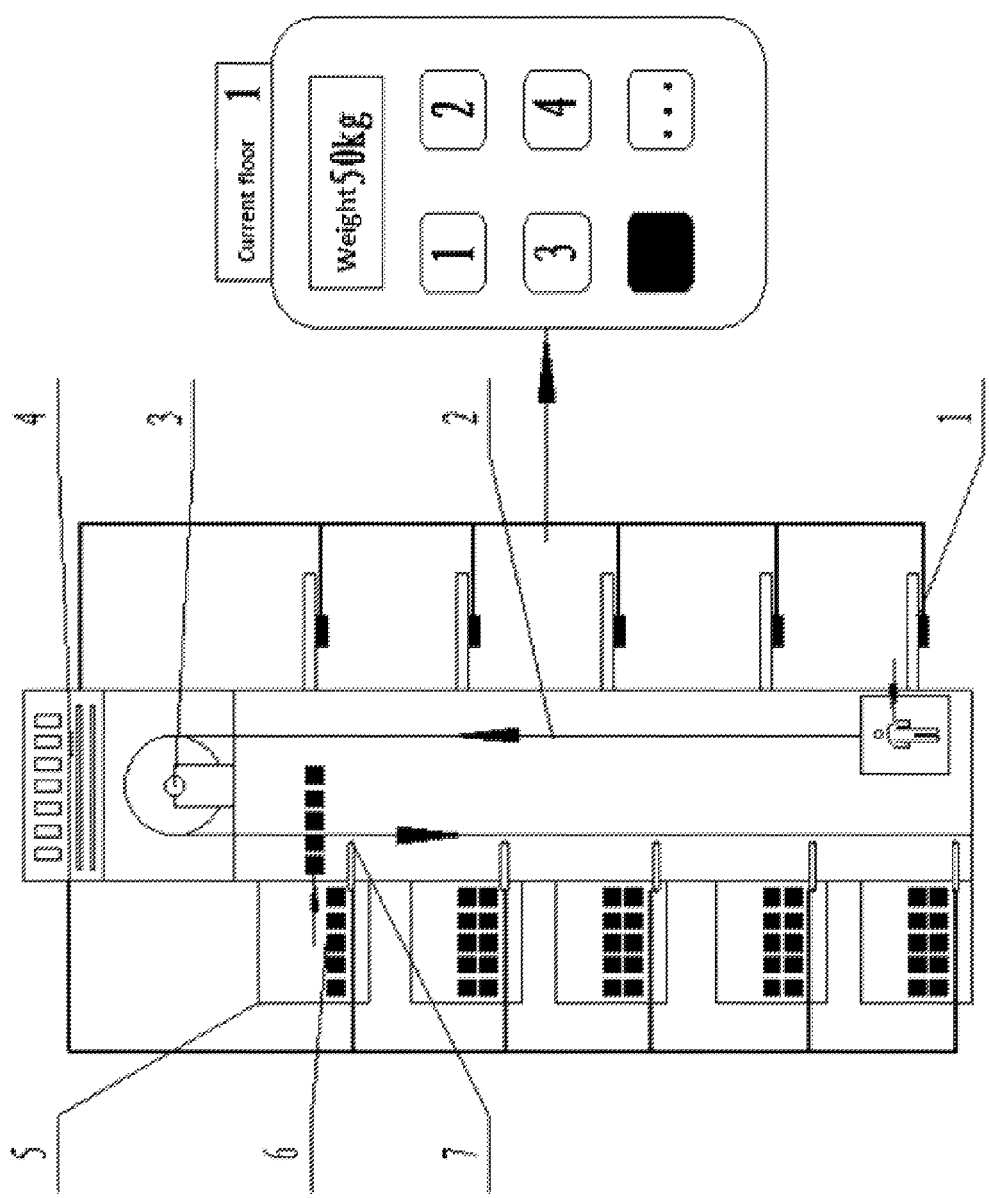
FIG. 3 is a schematic diagram of the variable mass elevator apparatus and external control when the weight of the passenger is 50 kg, the starting floor is the first floor, the desired floor is the fifth floor, and the elevator car is on the first floor.

FIG. 3 is an embodiment of FIG. 1, when the passenger has selected the fifth floor as the desired floor, and the passenger has stepped into the elevator car 2 on the first floor. The passenger weighs 50 kg.

On the opposite side of the elevator shaft from the elevator car door side, a mass storage area 5 is disposed next to the elevator shaft on each floor and coupled to the mass conveyer 7. The mass conveyer 7 of each floor is coupled to the control computer to receive a signal to move a mass 6 to be coupled to the elevator cable according to the weight of the passenger relayed via the control computer 4. The electronic scale 1 is configured to relay the weight of the passenger to the control computer 4 via a signal line.

The control computer 4 controls the traction sheave 3 via signal line and controls the motor of the traction sheave 3 to move the elevator car 2 according to the user selection. The control computer 4 receives the weight of the user when the user is standing on the electronic scale 1 disposed in front of the entrance to the elevator. When the user selects a desired floor, the control computer 4 moves the elevator car 2 using the traction sheave 3 to the user's starting floor. Once the elevator car 2 has arrived at the user's starting floor, the control computer 4 controls the mass conveyer 7 to move a mass 6 from the mass storage area 5 of the desired floor corresponding to the weight of the passenger to be coupled to the elevator cable to act as a counterweight to the weight of the passenger.

Once the user has stepped inside the elevator car, the control computer 4 will instruct the traction sheave 3 to move the elevator car 2 to the desired floor. Once at the desired floor, the elevator car 2 will open its doors and allow the user to exit. The control computer 4 will signal to the mass conveyer 7 of the desired floor to move the mass 6 from the elevator cable and into the mass storage area 5 of the desired floor.

By moving the mass 6 to be used as a counterweight to the weight of the passenger, the present invention reduces the amount of energy required by the traction sheave 3 to move the elevator car 2. The control computer 4 instructs the mass conveyer 7 to move a mass 6 corresponding to the weight of the passenger to substantially counteract the potential energy of the passenger once inside the suspended elevator car 2. In this embodiment, the passenger weighs 50 kg and the mass 6 is five 10 kg mass units. The mass 6 can comprise a number of fixed mass units. The mass 6 is moved by the mass conveyer 7 on the desired floor (the fifth floor). By moving the mass 6 to be coupled to the elevator cable to act as a counterweight from the fifth floor, the control computer 4 is matching the change in potential energy of the weight of the passenger. In FIG. 3, each mass unit is 10 kg. Once the passenger is inside the elevator car 2, the control computer 4 signals to the traction sheave 3 to begin moving the elevator car 2 to the desired floor.

Figure 4:
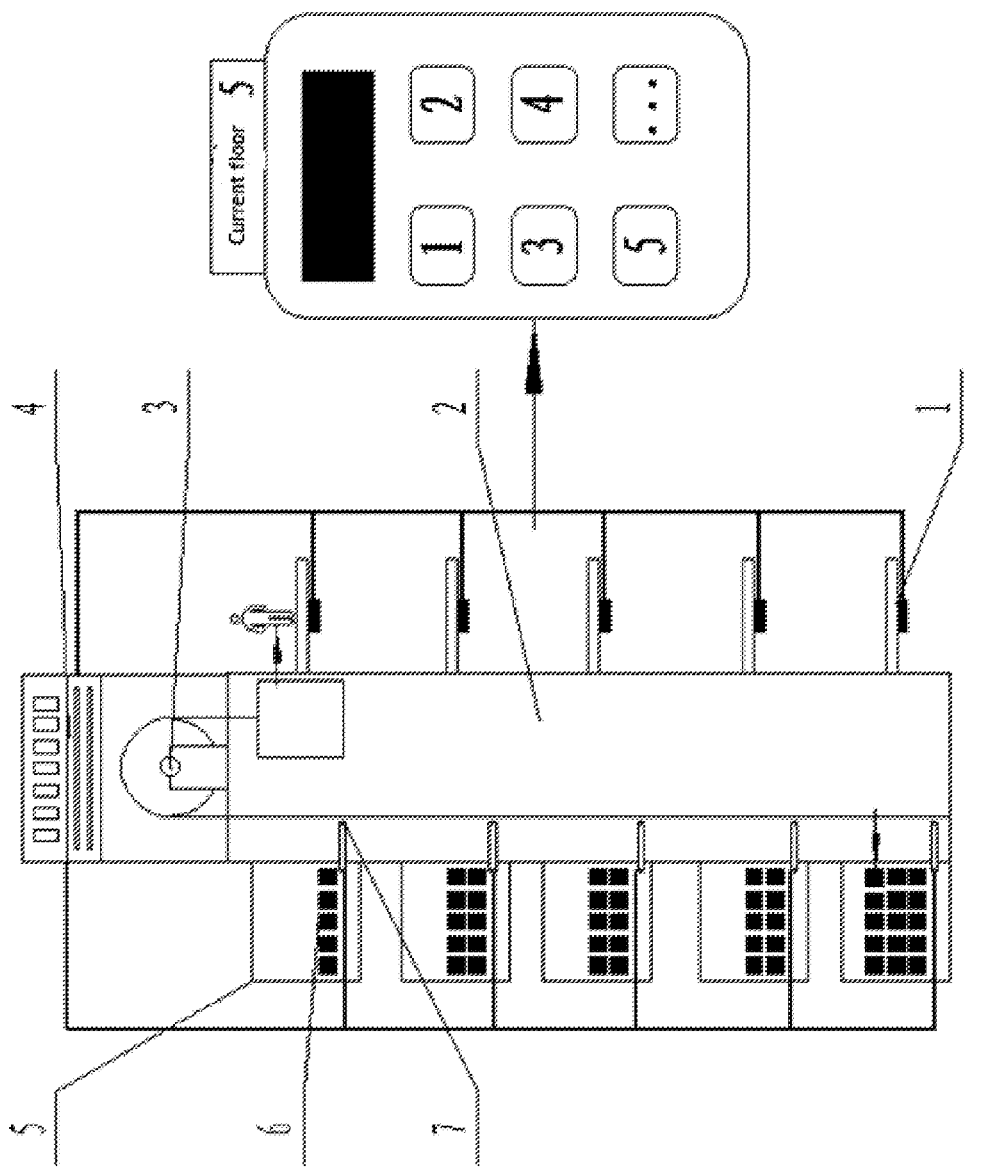
FIG. 4 is a schematic diagram of the variable mass elevator apparatus and external control when the weight of the passenger is 50 kg, the starting floor is the first floor, the desired floor is the fifth floor, and the elevator car is on the fifth floor.

FIG. 4 is a schematic diagram of the embodiment of FIG. 3, when the elevator car 2 has arrived at the desired floor of the passenger. The control computer 4 signals to the traction sheave 3 to stop the elevator car 2 at the desired floor. When the elevator car 2 has arrived at the desired floor, the control computer 4 signals to the mass conveyer 7 to remove the mass 6 coupled to the elevator cable, and the mass conveyer 7 moves the mass 6 to the mass storage area 5 on the desired floor.

Figure 5:
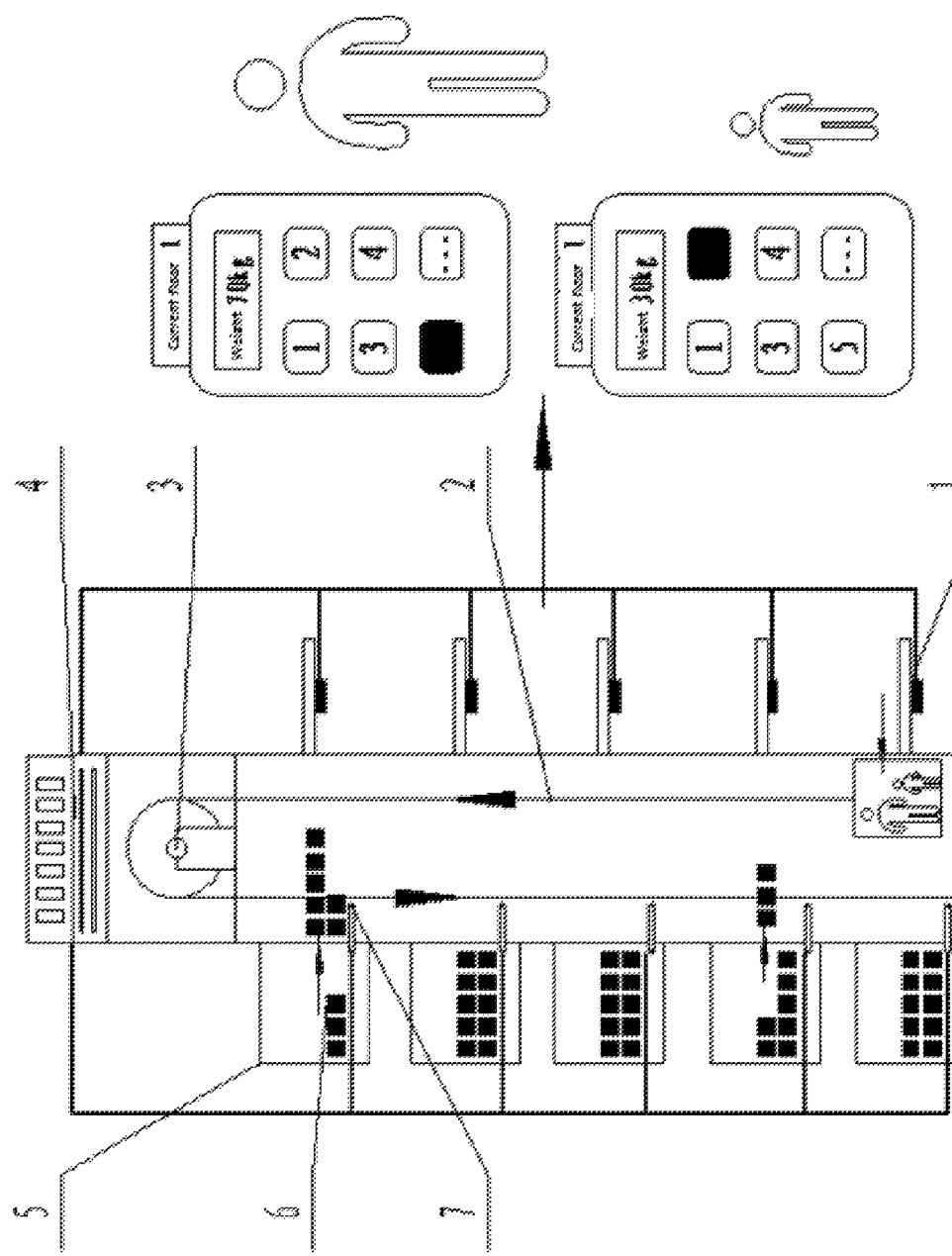
FIG. 5 is a schematic diagram from an entrance-side of the variable mass elevator apparatus and external control when there are two passengers, the weights of the passengers are 30 kg and 70 kg, the starting floor is the first floor, the desired floors are the second and fifth floors, and the elevator car is on the first floor.

FIG. 5 is an embodiment of FIG. 1, when there are two passengers in the elevator car 2, and the passengers weigh 70 kg and 30 kg, respectively. The starting floor is the first floor for the elevator car 2, and the desired floors are the second and fifth floors. The first passenger weighing 70 kg selected the fifth floor while standing on the electronic scale 1. The electronic scale 1 relays the weight of the first passenger and the floor control panel relays the desired floor to the control computer 4. The control computer 4 associates the first passenger's weight with the desired fifth floor. The second passenger weighing 30 kg selected the second floor while standing on the electronic scale 1. The electronic scale 1 relays weight of the second passenger to the control computer 4 and the floor control panel relays the second passenger's desired floor to the control computer 4. The control computer 4 associates the weight of the second passenger to the desired second floor. Similar to FIG. 3, the control computer 4 has instructed the mass conveyer 7 on the second and fifth floor to move a first mass 6 on the fifth floor and a second mass on the second floor to be coupled to the elevator cable. The first mass 6 is 70 kg, or seven 10 kg mass units. The second mass is 30 kg, or three 10 kg mass units. The potential energy of first passenger is matched to the first mass 6 attached to the elevator cable at the fifth floor and the potential energy of the second passenger is matched to the second mass attached to the elevator cable at the second floor.

The control computer 4 then instructs the traction sheave 3 to begin moving the elevator car 2 once the mass 6 matches the weight of the passengers and the passengers are inside the elevator car 2.

Figure 6:
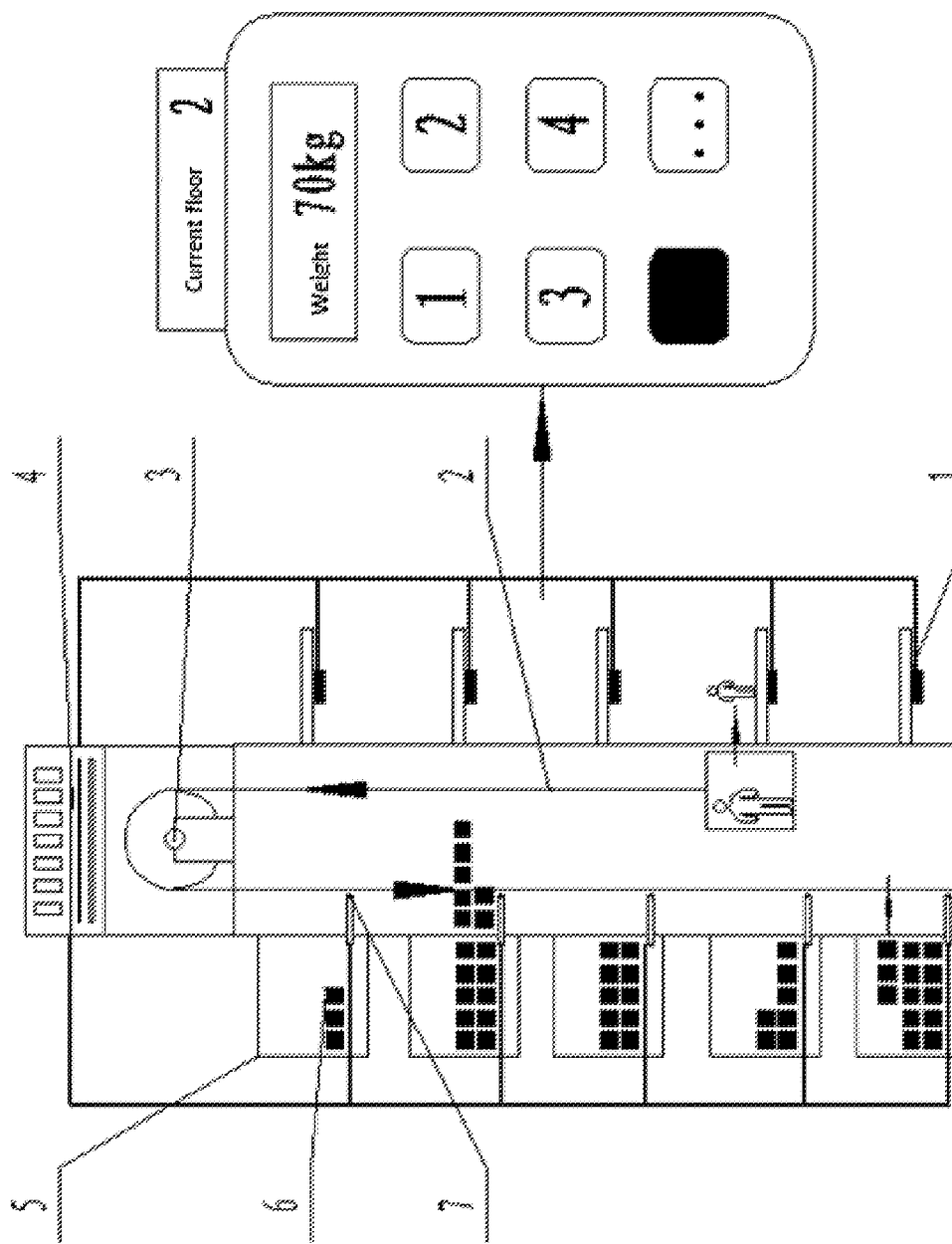
FIG. 6 is a schematic diagram from an entrance-side of the variable mass elevator apparatus and external control when there are two passengers, the weights of the passengers are 30 kg and 70 kg, the starting floor is the first floor, the desired floors are the second and fifth floors, and the elevator car is on the second floor.

FIG. 6 is a schematic diagram of the embodiment of FIG. 5, when the elevator car 2 has been moved by the traction sheave 3 to the second floor. The traction sheave 3 stops the elevator car 2 at the second floor allowing the second passenger to depart. The control computer 4 instructs the mass conveyer to remove the second mass from the elevator cable and move the second mass into the mass storage area of the second floor. Once the second passenger has departed and the second mass has been removed by the mass conveyer, the potential energy of the passengers in the car is once again matched to the potential energy of the suspended counterweight. The control computer 4 then instructs the traction sheave 3 to begin moving the elevator car 2 to the first passenger's desired floor.

Figure 7:
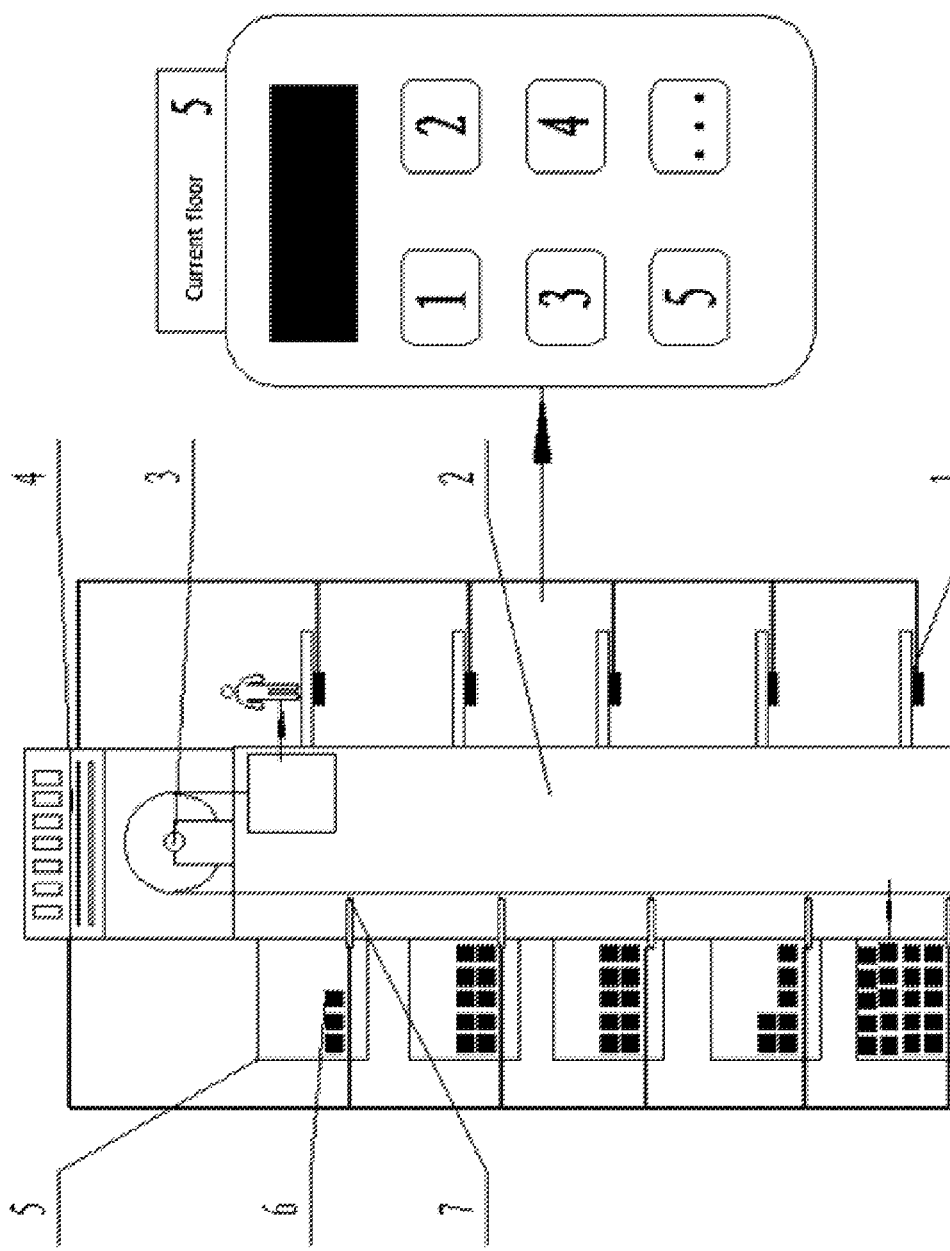
FIG. 7 is a schematic diagram from an entrance-side of the variable mass elevator apparatus and external control when there are two passengers, the weights of the passengers are 30 kg and 70 kg, the starting floor is the first floor, the desired floors are the second and fifth floors, and the elevator car is on the fifth floor.

FIG. 7 is a schematic diagram of the embodiment of FIG. 5, when the elevator car 2 has been moved by the traction sheave 3 to the fifth floor, or the first passenger's desired floor. The traction sheave 3 stops the elevator car 2 at the first passenger's desired floor, and the control computer 4 instructs the mass conveyer to remove the first mass from the elevator cable, resetting the potential energy of the counterweight to match an empty elevator car 2, once the first passenger departs.

The foregoing description of the preferred embodiments is presented for purposes of illustration and description. It is not intended to be exhaustive or limit the invention to the precise form of the exemplary embodiments disclosed. Many modifications and variations will be apparent to those of ordinary skill in the art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims.

What is claimed is:

1. A variable mass elevator apparatus with an external control, comprising:
    an elevator shaft;
    an elevator car, disposed inside said elevator shaft;
    a traction sheave, comprising a sheave and a motor;
    an elevator cable, coupled to the elevator car and disposed around the traction sheave, wherein the traction sheave rotates and moves the elevator cable and elevator car;
    a first floor control panel, comprising a plurality of buttons corresponding to floors of a building, wherein the first floor control panel is disposed next to an elevator entrance on each floor of a building outside of the elevator car;
a first electronic scale, disposed in front of the floor control panel to weigh a first passenger, wherein the first passenger inputting a first desired floor on the floor control panel stands on the electronic scale when inputting said first desired floor;
a first mass storage area, disposed adjacent to the elevator shaft on an opposite side of an entrance to the elevator car and on the first desired floor;
a first mass, stored in the first mass storage area;
a first mass conveyer, coupled to the first mass storage area on the first desired floor;
a control computer, coupled to the first floor control panel, the first electronic scale, and the first mass conveyer, wherein the control computer receives a first weight of the first passenger from the first electronic scale, the first desired floor from the first floor control panel, and instructs the first mass conveyer to move the first mass corresponding to the first weight to be coupled to the elevator cable as a counterweight to the first passenger;
wherein, when the first passenger is inside the elevator car after the first mass is coupled to the elevator cable, the control computer instructs the traction sheave to rotate and move the elevator cable and the elevator car to the first desired floor.

2. The apparatus of claim 1, further comprising:
a second mass storage area, disposed adjacent to the elevator shaft on the opposite side of the entrance to the elevator car and on a starting floor of the first passenger;
a second mass conveyer, coupled to the second mass storage area on the starting floor of the first passenger;
wherein when the elevator car has moved to the first desired floor, the elevator car opens to allow the first passenger to exit, and the control computer instructs the second mass conveyer to remove the first mass from the elevator cable to the second mass storage area.

3. The apparatus of claim 1, further comprising:
a third mass storage area, disposed adjacent to the elevator shaft on the opposite side of the entrance to the elevator car and on a second desired floor of a second passenger;
a third mass conveyer, coupled to the third mass storage area on the second desired floor;
a second mass, stored in the third mass storage area;
wherein, when the second passenger inputs a second desired floor while standing on the first electronic scale, the first electronic scale sends a second weight of the second passenger to the control computer, the first control panel sends a second desired floor to the control computer, and the control computer instructs a third mass conveyer to move the second mass to be coupled to the elevator cable; and
wherein, when the second passenger is inside the elevator car after the second mass is coupled to the elevator cable, the control computer instructs the traction sheave to rotate and move the elevator cable and the elevator car to the second desired floor.

4. The apparatus of claim 3, further comprising:
a second mass storage area, disposed adjacent to the elevator shaft on the opposite side of the entrance to the elevator car and on a starting floor of the second passenger;
a second mass conveyer, coupled to the second mass storage area on the starting floor of the second passenger;
wherein when the elevator car has moved to the second desired floor, the elevator car opens to allow the second passenger to exit, and the control computer instructs the second mass conveyer to remove the second mass from the elevator cable to the second mass storage area.

5. A method of operating a variable mass elevator apparatus, comprising:
providing an elevator shaft;
providing an elevator car, disposed in the elevator shaft;
providing a traction sheave, comprising a sheave and a motor;
providing an elevator cable, coupled to the elevator car and disposed around the traction sheave, wherein the traction sheave rotates and moves the elevator cable and elevator car;
providing a first floor control panel, comprising a plurality of buttons corresponding to floors of a building, wherein the first control panel is disposed outside of the elevator car;
providing an electronic scale, disposed in front of the first control panel to weigh a first passenger, wherein the first passenger inputting a first desired floor on the floor control panel stands on the electronic scale when inputting said first desired floor;
providing a first mass storage area, disposed adjacent to the elevator shaft on an opposite side of an entrance to the elevator car and on the first desired floor;
providing a first mass, stored in the first mass storage area;
providing a first mass conveyer, coupled to the first mass storage area on the first desired floor;
providing a control computer, coupled to the first floor control panel, the first electronic scale, and the first mass conveyer,
receiving the first desired floor as an input on the first floor control panel and transmitting the first desired floor to the control computer;
weighing the first passenger using the electronic scale and transmitting a first weight of the passenger to the control computer;
instructing the first mass conveyer to move the first mass from the first mass storage area to be coupled to the elevator cable, wherein the first mass corresponds to the first weight and acts as a counterweight to the first passenger;
wherein, when the first passenger is inside the elevator car after the first mass is coupled to the elevator cable, the control computer instructs the traction sheave to rotate and move the elevator cable and the elevator car to the first desired floor.

6. The method of claim 1, further comprising:
providing a second mass storage area, disposed adjacent to the elevator shaft on the opposite side of the entrance to the elevator car and on a starting floor of the first passenger;
providing a second mass conveyer, coupled to the second mass storage area on the starting floor of the first passenger;
wherein when the elevator car has moved to the first desired floor, the elevator car opens to allow the first passenger to exit, and the control computer instructs the second mass conveyer to remove the first mass from the elevator cable to the second mass storage area.

* * * * *